United States Patent
Callas et al.

(10) Patent No.: US 9,235,532 B2
(45) Date of Patent: Jan. 12, 2016

(54) SECURE STORAGE OF FULL DISK ENCRYPTION KEYS

(75) Inventors: Jonathan D. Callas, San Jose, CA (US); Russell D. Reece, Foster City, CA (US)

(73) Assignee: Apple Inc., Cupertino, CA (US)

( * ) Notice: Subject to any disclaimer, the term of this patent is extended or adjusted under 35 U.S.C. 154(b) by 85 days.

(21) Appl. No.: 13/153,311

(22) Filed: Jun. 3, 2011

(65) Prior Publication Data

US 2012/0311288 A1    Dec. 6, 2012

(51) Int. Cl.
*G06F 11/30*     (2006.01)
*G06F 12/14*     (2006.01)
*G06F 21/60*     (2013.01)
*G06F 21/78*     (2013.01)

(52) U.S. Cl.
CPC .......... *G06F 12/1408* (2013.01); *G06F 21/602* (2013.01); *G06F 21/78* (2013.01); *G06F 2221/2107* (2013.01)

(58) Field of Classification Search
CPC ................................................. G06F 12/1408
USPC .......................................................... 711/166
See application file for complete search history.

(56) References Cited

U.S. PATENT DOCUMENTS

| | | | | |
|---|---|---|---|---|
| 7,134,025 B1 * | 11/2006 | Trimberger | ................... | 713/189 |
| 7,366,306 B1 * | 4/2008 | Trimberger | ................... | 380/278 |
| 7,853,804 B2 * | 12/2010 | Cromer et al. | ................ | 713/193 |
| 8,130,554 B1 * | 3/2012 | Linnell | ..................... | 365/185.28 |
| 8,204,215 B2 * | 6/2012 | You | ...................... | H04L 9/0637 380/259 |
| 8,286,004 B2 * | 10/2012 | Williams | ................ | G06F 21/31 713/193 |
| 8,300,825 B2 * | 10/2012 | Sarangdhar et al. | .......... | 380/277 |
| 8,560,845 B2 * | 10/2013 | Krsti | ....................... | G06F 21/44 713/161 |
| 8,819,450 B2 * | 8/2014 | Cherian | ................. | G06F 21/64 707/687 |
| 8,886,956 B2 * | 11/2014 | Lee | ......................... | G06F 21/80 713/189 |
| 8,886,962 B2 * | 11/2014 | Hobbett | ................. | G06F 21/00 380/259 |
| 2002/0042859 A1 * | 4/2002 | Lowry | ......................... | 711/100 |
| 2002/0126843 A1 * | 9/2002 | Murase et al. | ... | G11B 20/00086 380/201 |
| 2005/0114686 A1 * | 5/2005 | Ball | ........................ | G06F 21/78 713/193 |
| 2006/0177061 A1 * | 8/2006 | Orsini et al. | .................. | 380/268 |
| 2007/0160198 A1 * | 7/2007 | Orsini et al. | ..................... | 380/28 |
| 2007/0294496 A1 * | 12/2007 | Goss et al. | ..................... | 711/163 |
| 2008/0052541 A1 * | 2/2008 | Ginter et al. | .................. | 713/194 |
| 2008/0072071 A1 * | 3/2008 | Forehand | ................ | G06F 21/34 713/193 |
| 2008/0077807 A1 * | 3/2008 | Hicks | ...................... | G06F 21/57 713/193 |
| 2008/0109396 A1 * | 5/2008 | Kacin | ................................ | 707/1 |

(Continued)

OTHER PUBLICATIONS

Proof of set being asubset of itself, "SOLUTION: explain why every set is a subset of itself", retrieved from http://www.algebra.com/algebra/homework/real-numbers/real-numbers.faq.question.487462.html on Sep. 12, 2013 (1 page).*

(Continued)

*Primary Examiner* — Yong Choe
*Assistant Examiner* — Daniel C Chappell
(74) *Attorney, Agent, or Firm* — Blakely, Sokoloff, Taylor & Zafman LLP

(57) ABSTRACT

Data is securely stored on a storage device by encoding a data block into multiple encoded blocks, any number of which can be recombined to recover the data block. The encoded blocks are stored at known logical locations corresponding to physical locations on a storage device that change over time. When the data needs to be destroyed, at least one of the encoded blocks is overwritten with arbitrary data. In one aspect, the encoded blocks include at least one random block that is used to encode the data block. In another aspect, the known logical locations are stored in metadata.

18 Claims, 6 Drawing Sheets

(56) References Cited

U.S. PATENT DOCUMENTS

| | | | | |
|---|---|---|---|---|
| 2008/0114994 | A1* | 5/2008 | Iyer et al. | 713/193 |
| 2008/0263363 | A1* | 10/2008 | Jueneman et al. | 713/184 |
| 2009/0196417 | A1* | 8/2009 | Beaver et al. | 380/45 |
| 2009/0224884 | A1* | 9/2009 | Tuttle | G06K 7/0008 340/10.1 |
| 2010/0031061 | A1* | 2/2010 | Watanabe et al. | 713/193 |
| 2010/0281273 | A1* | 11/2010 | Lee et al. | 713/190 |
| 2010/0299313 | A1* | 11/2010 | Orsini et al. | 707/652 |
| 2010/0299538 | A1* | 11/2010 | Miller | G06F 12/1408 713/190 |
| 2011/0138477 | A1* | 6/2011 | Jones et al. | 726/27 |
| 2011/0154060 | A1* | 6/2011 | Guyot et al. | 713/193 |
| 2011/0289271 | A1* | 11/2011 | Nagpal et al. | 711/114 |
| 2012/0151223 | A1* | 6/2012 | Conde Marques et al. | 713/193 |
| 2013/0019111 | A1* | 1/2013 | Martin | G06F 21/62 713/193 |
| 2013/0166920 | A1* | 6/2013 | Cousins | G06F 12/1408 713/189 |
| 2014/0020083 | A1* | 1/2014 | Fetik | G06F 21/552 726/11 |
| 2014/0281574 | A1* | 9/2014 | Webb | G06F 21/74 713/189 |

OTHER PUBLICATIONS

TCG Storage Security Subsystem Class: Opal, Trusted Computing Group, Apr. 20, 2009, retrieved from http://www.trustedcomputing-group.org/files/static_page_files/B66DB236-1D09-3519-ADD7E75C7216311D/Opal_SSC_1.00_rev2.00-Final.pdf (82 pages).*

Proof of set being a subset of itself, "SOLUTION: explain why every set is a subset of itself", retrieved from http://www.algebra.com/algebra/homework/real-numbers/real-numbers.faq.question.487462.html on Sep. 12, 2013 (1 page).* xor (exclusive-or), About.com, May 29, 2006, retrieved from http://web.archive.org/web/20060529031026/http://linux.about.com/cs/linux101/a/xor_exclusive-.htm (2 pages).*

Create and Share (with a client app) a Random Encryption Key, John Simmons, Oct. 5, 2010, retrieved from http://www.codeproject.com/Articles/115435/Create-and-Share-with-a-client-app-a-Random-Encryp (8 pages).*

Cipher block chaining (CBC), Margaret Rouse, Jun. 2007, retrieved from http://searchsecurity.techtarget.com/definition/cipher-block-chaining on Dec. 20, 2014 (5 pages).*

IBM System Storage Data Encryption, Osuna et al, Jun. 2010, retrieved from http://www.redbooks.ibm.com/redbooks/pdfs/sg247797.pdf on Aug. 31, 2015, pp. 133-182 (50 pages).*

The DES Algorithm Illustrated, J. Orlin Grabbe, Dec. 4, 2001, retrieved from http://memresearch.org/grabbe/des.htm on Sep. 1, 2015 (11 pages).*

Welcome to the J. Orlin Grabbe Memorial Archive, Dec. 4, 2001, retrieved from http://memresearch.org/grabbe/index.html on Sep. 1, 2015 (27 pages).*

* cited by examiner

SECURE STORAGE OF FULL DISK ENCRYPTION KEYS

FIELD OF THE INVENTION

This invention relates generally to data security, and more particularly to secure destruction of sensitive data.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies: Copyright© 2010, Apple Inc., All Rights Reserved.

BACKGROUND

Sensitive data, such as encryption keys, saved on storage devices should be securely deleted when the device is moved from one computer to another or is taken out of service. However, this is not always possible. Modern rotating media transparently moves some parts of the storage to new locations if the media starts to develop errors. Flash storage or "solid-state disks" do this as a matter of course to even out the number of times that a given sector of the device has been used. The end result is that the high-level user of these mass storage devices cannot rely on overwriting data as a way of erasing it. Any time that a location on mass storage is written, there is a chance that the old data will remain on the device. While this is an unusual occurrence on rotating storage media, it is a common mode of operation on solid-state storage. Consequently, highly sensitive information such as encryption keys must be protected by mechanisms that presume that there is always a chance that overwriting does not ensure the sensitive data has been destroyed.

SUMMARY

Data is securely stored on a storage device by encoding a data block into multiple encoded blocks, any number of which can be recombined to recover the data block. The encoded blocks are stored at known logical locations corresponding to physical locations on the storage device that change over time. When the data needs to be destroyed, at least one of the encoded blocks is overwritten with arbitrary data. In one aspect, the encoded blocks include at least one random block that is used to encode the data block. In another aspect, the known logical locations are stored in metadata.

DETAILED DESCRIPTION

In the following detailed description of embodiments of the invention, reference is made to the accompanying drawings in which like references indicate similar elements, and in which is shown by way of illustration specific embodiments in which the invention can be practiced. These embodiments are described in sufficient detail to enable those skilled in the art to practice the invention, and it is to be understood that other embodiments can be utilized and that logical, mechanical, electrical, functional and other changes can be made without departing from the scope of the present invention. The following detailed description is, therefore, not to be taken in a limiting sense, and the scope of the present invention is defined only by the appended claims.

Figure 1:
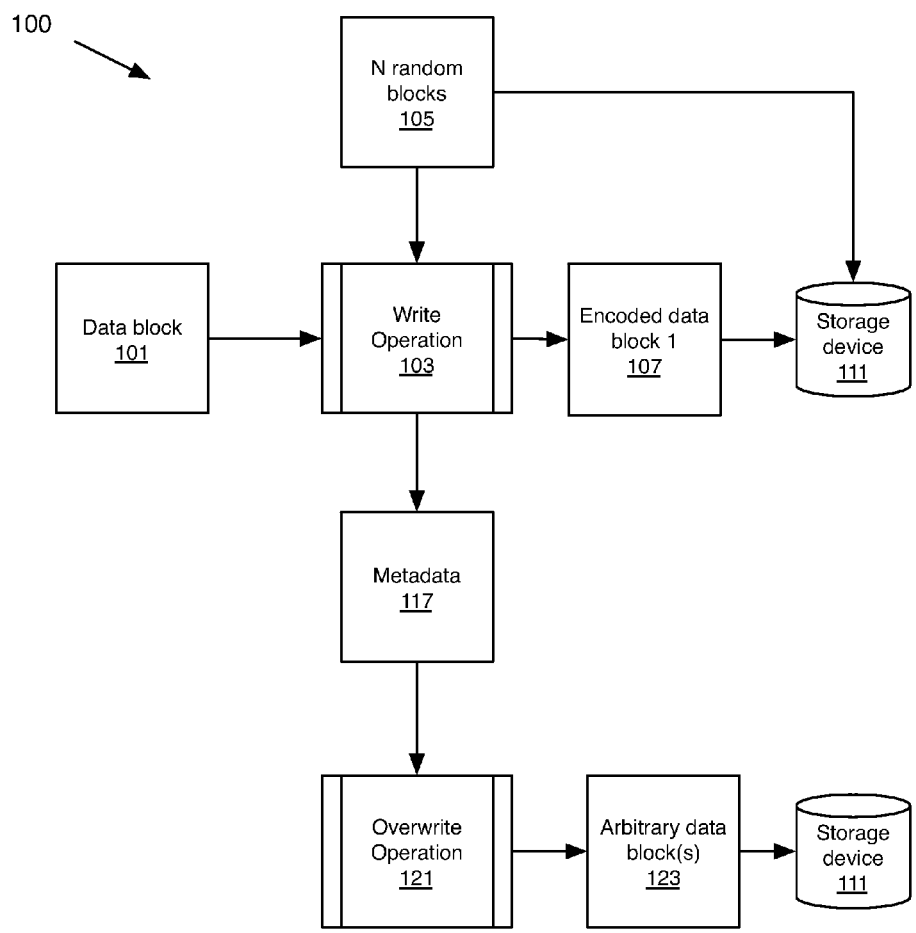
FIG. 1 is a diagram illustrating a overview of an embodiment of a write operation and an overwrite operation according an embodiment of the invention.

Beginning with an overview of the operation of the invention, FIG. 1 illustrates one embodiment of securely storing a block of data 101 that contains sensitive information, such as a data block containing an encryption key. A write operation 103 incorporates an encoding process that uses N random blocks 105 containing random numbers to produce an encoded data block 107 from data block 101. The encoded data block 107 and the N random blocks 105 (collectively referred to herein as "encoded blocks") are stored to different known logical locations on a storage device 111. The known logical locations are saved in metadata 117 for subsequence use in reconstructing the data block 101 by decoding the encoded data block 107 with the random blocks 105, such as when reading data from the block, or in logically destroying the storage device 111 by overwrite operation 121. In the embodiment illustrated, the overwrite operation 121 uses the metadata 117 to overwrite one or more of the encoded blocks 107, 105 with blocks of arbitrary data 123. Thus, even if the physical storage device 111 is connected to a different computer after the overwrite operation is performed, the sensitive information is no longer readable.

The write operation 103 and the overwrite operation 121 can be incorporated as a standard part of a computer operating system or optionally installed as separate components. In one embodiment, the random blocks and the encoded blocks are the size of the allocation units of the storage device, or larger, to ensure that the blocks are stored to different physical sectors on the storage device. Since N+1 encoded blocks are stored, it will be appreciated that the larger the value of N, the greater the security but the more storage space required. Thus, the value of N chosen is a trade-off between security and storage space. The value of N can be a predetermined system default or can be input by the user of the computer. In an embodiment shown in FIG. 3A and described further below, N=1 and the encoding process uses an exclusive OR function. In another embodiment shown in FIG. 3B and described further below, N=2 and the encoding process uses two exclusive OR functions.

Figure 2:
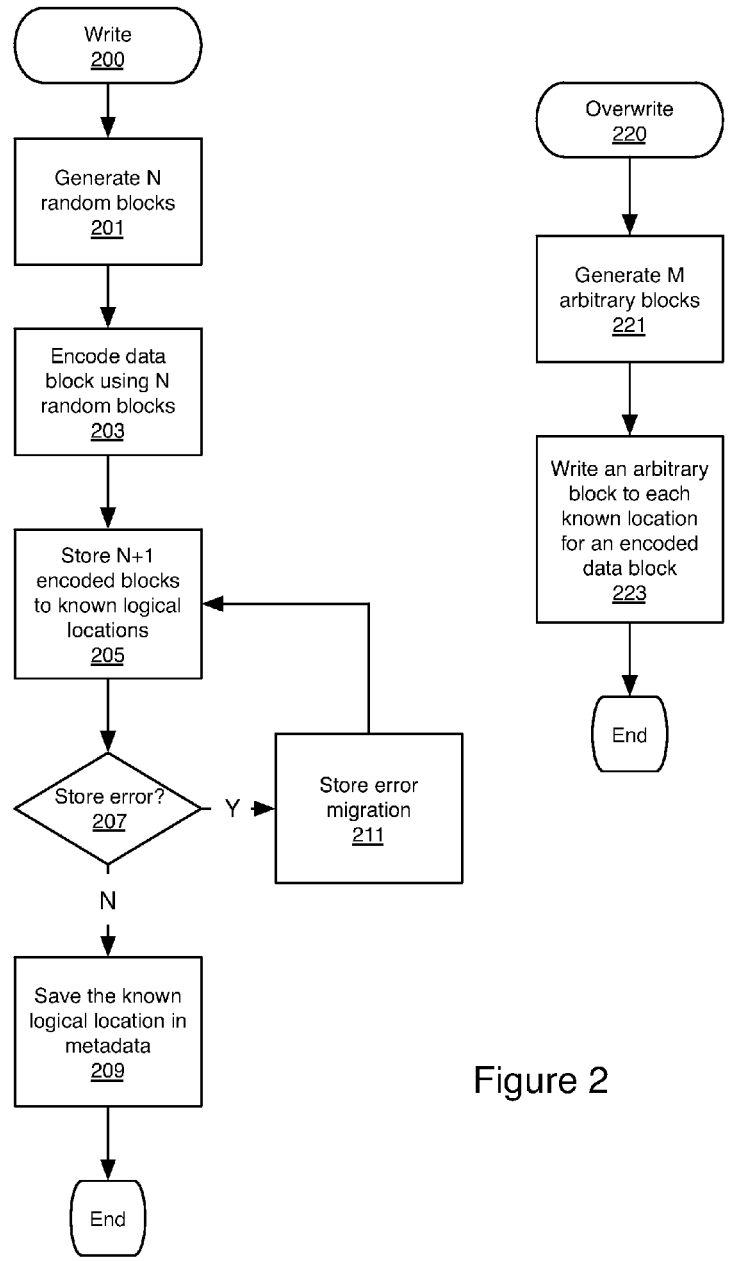
FIG. 2 are flow diagrams of a write method and an overwrite method to be executed by a computer to perform the operations of FIG. 1.

Next, the particular methods of the invention are described in terms of computer software with reference to flow diagrams in FIG. 2 that illustrate embodiments of the write and overwrite operations of FIG. 1. The write method 200 and the overwrite method 220 illustrated in FIG. 2 constitute computer programs made up of machine-executable instructions represented as process blocks 201, 203, etc.

The write method 200 is invoked when a data block containing sensitive data, such as data block 101 of FIG. 1, is to be stored on a storage device, such as device 111. At process block 201, the write method 200 generates N random blocks containing random numbers. The random numbers can be generated by calling a random number generation process or a random number generation algorithm can be incorporated into the write method 200. The write method 200 encodes the data block using each of the random blocks (process block 203), which produces N+1 encoded blocks. In one embodiment, the data block and each random block are input into an encoding process that performs a mathematical transformation on the inputs. At process block 205, the write method 200 instructs the operating system to store the encoded blocks at specific known logical locations on the storage device. In one embodiment, the encoded blocks are stored as an atomic transaction. If the store is successful (process block 207), the write method 200 saves the known logical locations in metadata for subsequent use (process block 209), such as standard metadata for the storage device. If the store is not successful, the write method 200 performs a store error migration process 211 and returns to process block 205 to retry storing the encoded blocks. In one embodiment, the store error migration process corrects any error condition that is present or selects one or more different known logical locations to store the encoded blocks. In an alternate embodiment not shown, the known logical locations are fixed and stored at initialization of the storage device, so it is not necessary to save the known logical locations in metadata each time the write method is invoked.

The overwrite method 220 is invoked when a destroy command is issued, such as by a user. At process block 221, the method 220 generates M blocks of arbitrary data and overwrites M encoded blocks on the device with an arbitrary block at process block 223. The arbitrary data can be random numbers, all zeros, all ones or a particular pattern of characters.

It will be appreciated that destruction of only one of the encoded blocks is sufficient to prevent the original data block from being reconstructed, i.e., M=1 in overwrite method 220. It will be further appreciated that applying the overwrite method 200 to a storage device that uses address virtualization may result in the arbitrary data being written to a different physical location from that where an encoded block is located. For example, solid state disks (SSDs) may be considered as address virtualization devices because they commonly incorporate a wear-leveling process that periodically changes the relationship between a logical address and the corresponding physical location on each write to reduce the wear on the flash memory that comprises the SSD. As a result, old data can remain on the device, i.e., the old data is "lost" data. Thus, if one or more of the encoded blocks become lost data, it would be possible to search for them to recover the original data block. However, when all the stored data is encrypted, each of encrypted block is information-theoretically pseudo-random, so a complete search across all encrypted blocks has n^2 complexity; any candidate block would have to be checked with each other candidate block. Changing the values of N and M changes the complexity of the search, but in any case, it is polynomial and such a search would require a prohibitive amount of time and computer power.

Figure 3A:
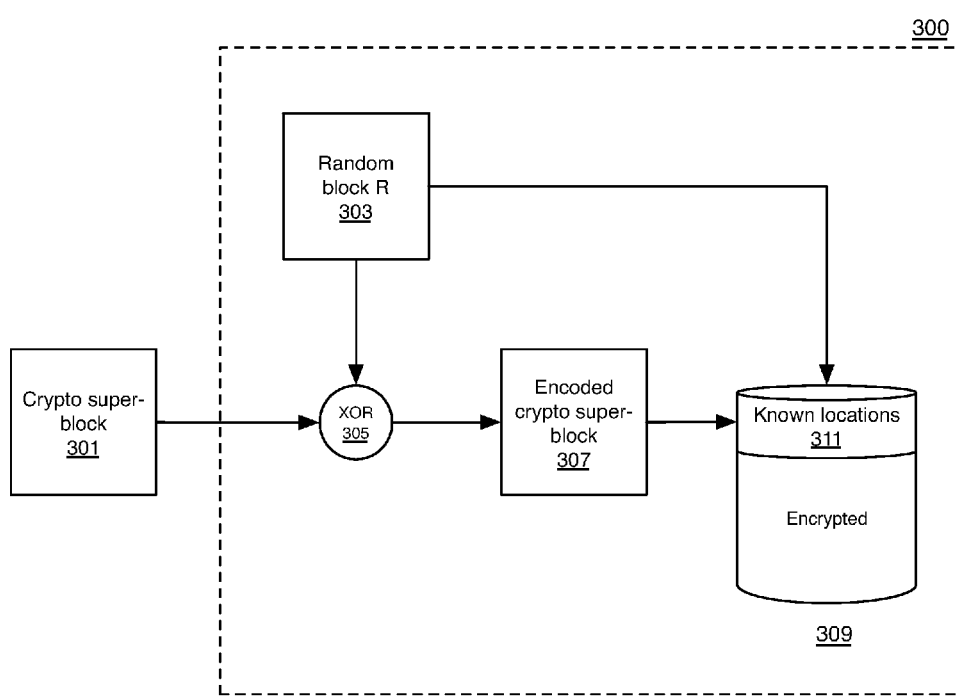
FIGS. 3A-C are diagrams of particular embodiments of a write operation to encode a crypto super-block.
Figure 3B:
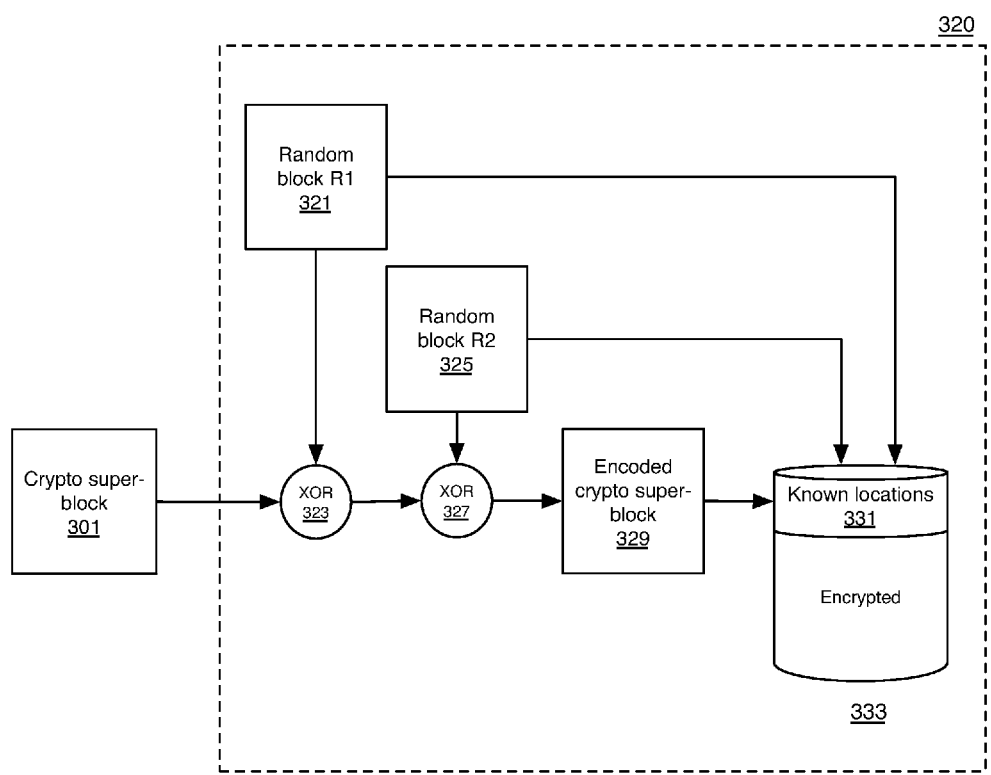
Figure 3C:
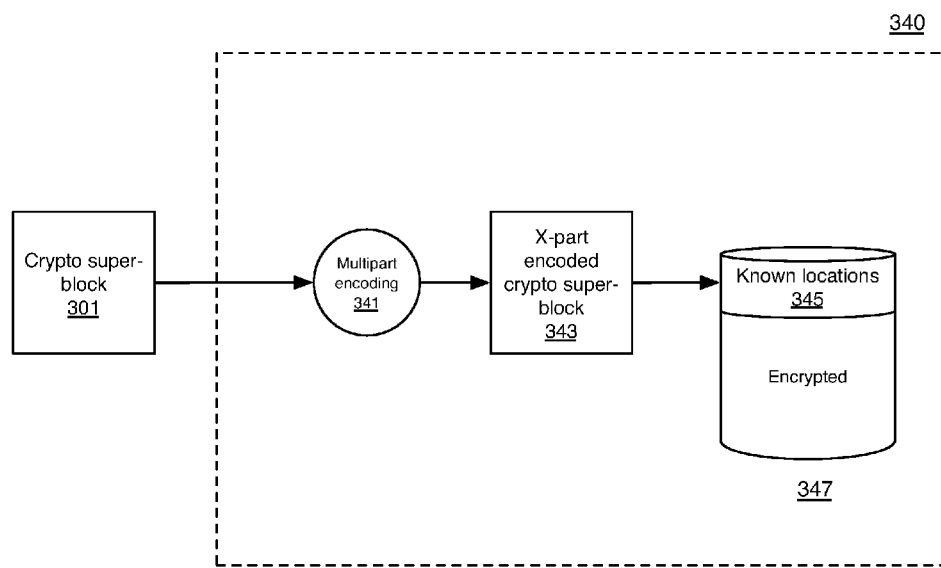

Particular implementations of the write operation for encoding a crypto super-block containing a full disk encryption key for a storage device are now described in conjunction with FIGS. 3A-C. It will be appreciated that the embodiments illustrated in FIGS. 3A-C are not limited to use with only crypto super-blocks and encryption keys, and can be employed to encode any type of sensitive data without exceeding the scope of the invention. Moreover, in FIGS. 3A-C, exclusive OR (XOR) is used as the encoding function for easy explanation of the encoding process and is not intended to limit the scope of protection to only XOR encoding functions. One of skill will immediately understand that the encoded crypto super-block can be destroyed using embodiments of the overwrite method 200 set forth above with appropriate values of M.

Starting with FIG. 3A, the write operation 300 generates a random block 303 and performs an XOR function 309 on the crypto super-block 301 and the random block 303. The resulting encoded block 307 and the random block are stored at known logical locations 311 on storage device 309. When it is necessary to reconstruct the crypto super-block to decrypt the contents of the storage device, the encoded block 301 and the random block 303 are retrieved from the storage device 309 and XOR'd together. In one aspect, the encoded data block 307 can be considered to be an encrypted version of the crypto super-block 301, and the random block 303 can be considered to be an encrypting key, using the XOR function 309 as the cipher.

In FIG. 3B, the write operation 320 encodes the crypto super-block 301 into encoded crypto super-block 329 using two random blocks 321, 325 and two sequential XOR functions 323, 327. The encoded blocks 321, 325, 329 are stored at known logical locations 331 on storage device 333. It will be appreciated that more than two random blocks and two XOR functions can be used and the invention is not limited by the embodiment of FIG. 3B.

FIG. 3C illustrates a write operation 340 that uses a multipart encoding function 341 to generate X encoded blocks from crypto super-block 301 and store the encoded blocks at known logical locations 345 on storage device 347. The multipart encoding function 341 can be a single XOR function, such as shown in FIG. 3A, multiple sequential XOR functions, such as shown in FIG. 3B, or other mathematical functions that generate multiple encoded blocks. Larger values of X improve the likelihood that the crypto super-block 301 can be rendered unrecoverable by the overwrite operation. However, increasing X will exponentially decrease the reliability of decoding because all the encoded blocks are required to reconstruct the crypto super-block 301. Therefore, the multipart encoding function 341 incorporates redundancy so that fewer (Y) than all the encoded blocks are required to reconstruct the crypto super-block 301. Correspondingly, overwriting more than X-Y encoded blocks is sufficient to render the crypto super-block 301 unrecoverable. For example, in FIG. 3A, there are two encoded blocks 303, 307, and overwriting only one encoded block renders the crypto super-block 301 unrecoverable. In FIG. 3B, there are three encoded block 321, 325, 329, and overwriting one or two of the encoded blocks renders the crypto super-block 301 unrecoverable. The values of X and Y used by the multipart encoding function 341 are selected to be a balance between reliability (easy recovery) and security (easy destruction), with Y being constrained to be greater than 1 and less than or equal to X. In one embodiment, X=5 and Y=4. Although updating the encoded blocks requires rewriting all five (X) blocks, the crypto super-block can be recovered by successfully reading at least four (Y) encoded blocks and rendered unrecoverable by successfully overwriting more than one (5-4) encoded block. One of skill in the art will immediately understand that the multipart encoding function 343 can be any well-known (Y,X)-threshold encryption algorithm, such as Shamir secret sharing, in which Y is the threshold value. In addition, a redundancy algorithm can be incorporated as one part of a multipart encoding process. In an exemplary embodiment, a multipart encoding process with redundancy uses two algorithms that performed sequentially. An encryption algorithm, such as XOR, generates Y encrypted blocks from the crypto super-block using an encryption algorithm, which provides security, and a redundancy algorithm, such as commonly used in RAID storage systems, generates X encoded blocks from the Y generated blocks, which provides reliability. To recover the crypto super-block, the algorithms are performed in reverse order. As many of the X encoded blocks as possible are read, and the redundancy algorithm is used to reconstruct the Y encrypted blocks from the available encoded blocks. The reconstructed Y encrypted blocks are input into the encryption algorithm (or an equivalent decryption algorithm) to recover the crypto super-block.

Figure 4:
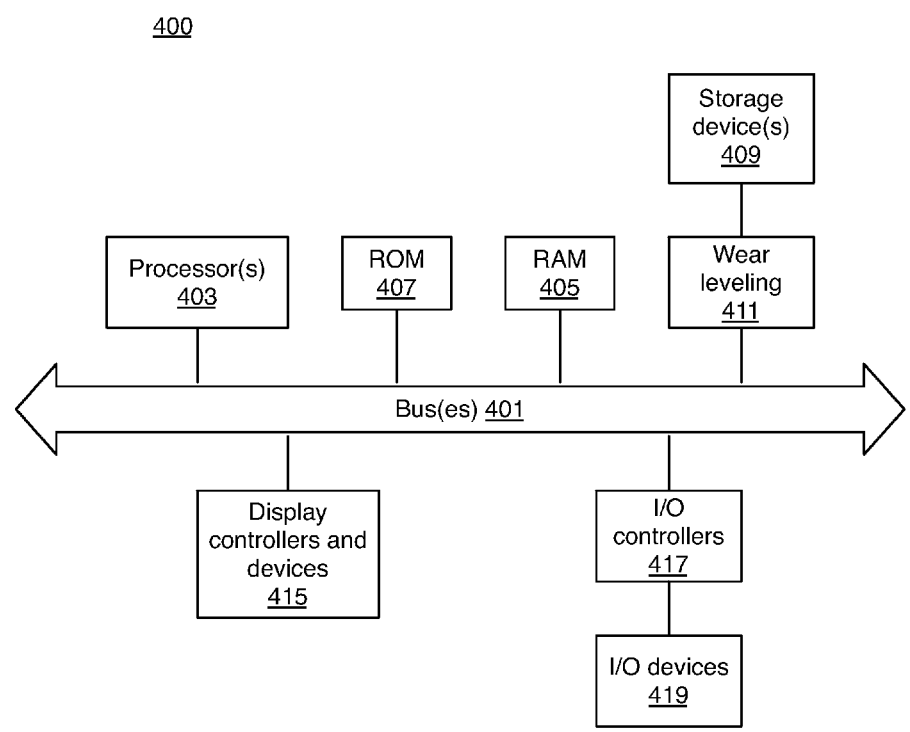
FIG. 4 is a diagram of a computer environment suitable for practicing embodiments of the write and destroy operations.

FIG. 4 illustrates an example of a typical computer system in which the write and overwrite operations described herein can be implemented. Note that while FIG. 4 illustrates various components of a computer system, it is not intended to represent any particular architecture or manner of interconnecting the components as such details are not germane to the present invention. It will also be appreciated that network computers and other data processing systems which have fewer components or perhaps more components can also be used with the present invention. The computer system of FIG. 4 can, for example, be a Macintosh computer from Apple Computer, Inc.

As shown in FIG. 4, the computer system 400, which is a form of a data processing system, includes a bus 401 which is coupled to processor(s) 403 and NVRAM (non-volatile random access memory) 407, RAM 405, and storage device(s) 409. The bus 401 interconnects these various components together and also interconnects these components 403, 407, 405, 409 to a display controller and display device 415, and to peripheral devices such as input/output (I/O) devices 419, which can be mice, keyboards, modems, network interfaces, printers and other devices which are well known in the art. Typically, the input/output devices 419 are coupled to the system through input/output controllers 417. The RAM 405 is typically implemented as dynamic RAM (DRAM), which requires power continually in order to refresh or maintain the data in the memory.

The storage device 409 is typically a hard drive or an optical drive or other storage devices that maintain data (e.g. large amounts of data) even after power is removed from the system. If one or more of the storage devices 409 is an SSD, a wear leveling component 411 distributes data evenly across the SSD to avoid having a high concentration of writes to a single block that could cause failure of the block. While FIG. 4 shows that the storage device 409 is a local device coupled directly to the rest of the components in the data processing system 400, it will be appreciated that the write and overwrite operations can be performed on a storage device coupled remotely to the system 400, such as a network storage device that is coupled to the data processing system through a network interface such as a wireless or Ethernet interface. The bus 401 can include one or more buses connected to each other through various bridges, controllers and/or adapters as is well known in the art. In one embodiment, the I/O controller 417 includes a USB (Universal Serial Bus) adapter for controlling USB peripherals and an IEEE 1394 controller for IEEE 1394 compliant peripherals.

The description of FIG. 4 is intended to provide an overview of computer hardware and other operating components suitable for implementing the write and overwrite operations, but is not intended to limit the applicable environments. It will be appreciated that the computer system 400 is one example of many possible computer systems which have different architectures. A typical computer system will usually include at least a processor, memory, and a bus coupling the memory to the processor. One of skill in the art will immediately appreciate that the invention can be practiced with other computer system configurations, including multiprocessor systems, minicomputers, mainframe computers, and the like. The invention can also be practiced in distributed computing environments where tasks are performed by remote processing devices that are linked through a communications network.

Write and overwrite operations that securely protect sensitive data, such as full disk encryption keys, has been described. The sensitive data is securely stored on a storage device by encoding the data block to spread the data across multiple encoded blocks on a storage device. Overwriting one of more of the multiple encoded blocks is sufficient to prevent recovery of the sensitive data. Although specific embodiments have been illustrated and described herein, it will be appreciated by those of ordinary skill in the art that any arrangement which is calculated to achieve the same purpose can be substituted for the specific embodiments shown. This application is intended to cover any adaptations or variations of the present invention.

For example, it will be appreciated that describing the write and overwrite methods in FIG. 2 by referencing flow diagrams enables one skilled in the art to develop computer programs including instructions to carry out the methods on suitably configured machines (the processor of the machine executing the instructions from machine-readable media, including memory). The machine-executable instructions can be written in a computer programming language or can be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages can be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or produce a result. It will be appreciated that more or fewer processes can be incorporated into the methods illustrated in FIG. 2 without departing from the scope of the invention and that no particular order is implied by the arrangement of blocks shown and described herein.

In addition, one of skill in the art will readily understand that the write and overwrite operations can be performed separately on different partitions of a storage device.

The terminology used in this application with respect to storages devices is meant to include all types of electronics that provide persistent storage of data when power is removed from the electronics. Therefore, it is manifestly intended that this invention be limited only by the following claims and equivalents thereof.

What is claimed is:

1. A method comprising:
    generating, by a processor, a plurality of random blocks of a pre-determined size for each data block to be encoded, the pre-determined size based on an allocation unit of a storage device;
    encoding, by the processor, a first data block into a single encoded data block of the pre-determined size using the plurality of generated random blocks, the single encoded data block generated by performing a mathematical operation on the first data block and each generated random block, wherein the single encoded data block and at least a subset of the generated random blocks are recombined to recover the first data block;
    storing the single encoded data block and each generated random block separately at different known logical locations, wherein a physical location on the storage device that corresponds to a known logical location changes over time; and overwriting at least one of the stored generated random blocks with arbitrary data.

2. The method of claim 1, wherein the encoding comprises:
performing a multipart function with redundancy on the first data block, wherein the mathematical operation is one part of the multipart function.

3. The method of claim 1, wherein the overwriting comprises:
generating a number of arbitrary data blocks, the number of arbitrary data blocks calculated by subtracting a number of blocks in the subset of generated random blocks from a number of blocks in the plurality of generated random blocks plus one.

4. The method of claim 1 further comprising:
saving the known logical locations in metadata.

5. The method of claim 1, wherein the first data block comprises an encryption key to encrypt the storage device.

6. A non-transitory machine-readable storage medium embodied with machine-executable instructions, which when executed by a processor in a machine, cause the processor to perform a method comprising:
generating a plurality of random blocks of a pre-determined size for each data block to be encoded, the pre-determined size based on an allocation unit of a storage device;
encoding a first data block into a single encoded data block of the pre-determined size using the plurality of generated random blocks, the single encoded data block generated by performing a mathematical operation on the first data block and each generated random block, wherein the single encoded data block and at least a subset of the generated random blocks are recombined to recover the first data block;
storing the single encoded data block and each generated random block separately at different known logical locations, wherein a physical location on the storage device that corresponds to a known logical location changes over time; and
overwriting at least one of the stored generated random blocks with arbitrary data.

7. The non-transitory machine-readable storage medium of claim 6, wherein the encoding comprises:
performing a multipart function with redundancy on the first data block, wherein the mathematical operation is one part of the multipart function.

8. The non-transitory machine-readable storage medium of claim 6, wherein the overwriting comprises:
generating a number of arbitrary data blocks, the number of arbitrary data blocks calculated by subtracting a number of blocks in the subset of the generated random blocks from a number of blocks in the plurality of generated random blocks plus one.

9. The non-transitory machine-readable storage medium of claim 6, further comprising:
saving the known logical locations in metadata.

10. The non-transitory machine-readable storage medium of claim 6, wherein the first data block comprises an encryption key to encrypt the storage device.

11. A system comprising:
a processor coupled to a memory through a bus;
a storage device coupled to the processor through the bus; and
a secure storage process executed from the storage device by the processor to cause the processor to generate a plurality of random blocks of a pre-determined size for each data block to be encoded, the pre-determined size based on an allocation unit of the storage device, encode a first data block into a single encoded data block of the pre-determined size using the plurality of generated random blocks, the single encoded data block generated by the processor performing a mathematical operation on the first data block and each generated random block, wherein the single encoded data block and at least a subset of the generated random blocks are recombined to recover the first data block;
store the single encoded data block and each generated random block separately at different known logical locations, wherein a physical location on the storage device that corresponds to a known logical location changes over time; and
overwrite at least one of the generated random blocks with arbitrary data.

12. The system of claim 11, wherein the secure storage process causes the processor to perform a multipart function with redundancy on the first data block to encode the first data block, wherein the mathematical operation is one part of the multipart function.

13. The system of claim 11, wherein the secure storage process causes the processor to generate a number of arbitrary data blocks, the number of arbitrary data blocks calculated by subtracting a number of blocks in the subset of generated random blocks from a number of blocks in the plurality of generated random blocks plus one.

14. The system of claim 11, wherein the secure storage process further causes the processor to save the known logical locations in metadata.

15. The system of claim 11, wherein the first data block comprises an encryption key to encrypt the storage device.

16. A method comprising:
overwriting, by a processor, at least one of a plurality of generated random blocks on a storage device with arbitrary data, the generated random blocks corresponding to a data block and having a pre-determined size based on an allocation unit of the storage device, wherein a single encoded data block having the pre-determined size and previously generated by performing a mathematical operation on a first data block and each generated random block is also stored on the storage device, wherein the single encoded data block and at least a subset of the generated random blocks are recombined to recover the first data block, and wherein the single encoded data block and each generated random block is stored separately at a different known logical location, each known logical location corresponding to a physical location on the storage device that changes over time.

17. A non-transitory machine-readable storage medium embodied with machine-executable instructions, which when executed by a processor in a machine, cause the processor to perform a method comprising:
overwriting at least one of a plurality of generated random blocks on a storage device with arbitrary data, the generated random blocks corresponding to a data block and having a pre-determined size based on an allocation unit of the storage device, wherein a single encoded data block having the pre-determined size and previously generated by performing a mathematical operation on a first data block and each generated random block is also store on the storage device, wherein the single encoded data block and at least a subset of the generated random blocks are recombined to recover the first data block, and wherein the single encoded data block and each generated random block is stored separately at a different known logical location, each known logical location corresponding to a physical location on the storage device that changes over time.

18. A system comprising:
a processor coupled to a memory through a bus;
a storage device coupled to the processor through the bus; and
an overwrite process executed from the memory by the processor to cause the processor to overwrite at least one of a plurality of generated random blocks on the storage device with arbitrary data, the generated random blocks corresponding to a data block and having a pre-determined size based on an allocation unit of the storage device, wherein a single encoded data block having the pre-determined size and previously generated by performing a mathematical operation on a first data block and each of the generated random blocks is also stored on the storage device, wherein the single encoded data block and at least a subset of the generated random blocks are recombined to recover the data block, and wherein the single encoded data block and each of the generated random blocks is stored separately at a different known logical location, each known logical location corresponding to a physical location on the storage device that changes over time.

\* \* \* \* \*